(12) United States Patent
Cline et al.

(10) Patent No.: US 7,060,184 B2
(45) Date of Patent: Jun. 13, 2006

(54) QUICK-DRAIN VALVE MEMBER FOR USE WITH FILTER APPARATUS

(75) Inventors: L. Steven Cline, Fayetteville, NC (US); Henry L. Neufeld, Tulsa, OK (US); Bryant L. Richie, Chillicothe, IL (US)

(73) Assignee: Arvin Technologies, Inc., Troy, MI (US)

( * ) Notice: Subject to any disclaimer, the term of this patent is extended or adjusted under 35 U.S.C. 154(b) by 112 days.

(21) Appl. No.: 10/442,733

(22) Filed: May 21, 2003

(65) Prior Publication Data

US 2004/0232063 A1    Nov. 25, 2004

(51) Int. Cl.
  *B01D 35/16*   (2006.01)
(52) U.S. Cl. .................. 210/248; 210/428; 210/453
(58) Field of Classification Search ............... 210/236, 210/248, 428, 433.1, 440, 443, 444, 454, 210/453; 251/356, 358
See application file for complete search history.

(56) References Cited

U.S. PATENT DOCUMENTS 3,861,646 A * 1/1975 Douglas .................. 251/356
4,196,886 A * 4/1980 Murray .................. 251/357
4,906,365 A   3/1990 Baumann et al.
5,468,386 A * 11/1995 Ardes .................... 210/248
5,814,215 A   9/1998 Bruss et al.
6,706,181 B1 * 3/2004 Baumann et al. ........... 210/236

FOREIGN PATENT DOCUMENTS

| DE | 3538589 A1 | * | 5/1987 |
| DE | 3903675 A1 | * | 8/1990 |
| DE | 195 38 883 A1 | | 4/1997 |
| DE | 298 15 023 U 1 | | 11/1998 |
| DE | 19951085 A1 | * | 4/2001 |
| GB | 2 162 079 A | | 1/1986 |
| WO | WO 01/30480 A1 | | 5/2001 |

* cited by examiner

*Primary Examiner*—Matthew O. Savage
(74) *Attorney, Agent, or Firm*—Barnes & Thornburg LLP

(57) ABSTRACT

A filter apparatus comprises a filter element to be positioned in an interior region defined by a housing. The filter element comprises a quick-drain valve member to block a flow of fluid from the interior region through a quick-drain outlet defined by the housing when the filter element is positioned in the interior region and to allow a flow of fluid from the interior region through the quick-drain outlet when the filter element is removed from the interior region.

20 Claims, 11 Drawing Sheets

QUICK-DRAIN VALVE MEMBER FOR USE WITH FILTER APPARATUS

FIELD OF THE DISCLOSURE

The present disclosure relates generally to filter apparatus for filtering fluids.

BACKGROUND OF THE DISCLOSURE

Filter apparatus are used onboard vehicles and in other apparatus containing fluid systems to remove unwanted solids or other contaminants from fluids. For example, filter apparatus are used to filter oil used in vehicle engines. Some filter apparatus are configured to drain fluid from the filter apparatus to a fluid reservoir upon removal of a filter element from the filter apparatus.

SUMMARY OF THE DISCLOSURE

According to an aspect of the present disclosure, a filter apparatus comprises a filter element to be positioned in the interior region of a housing to filter a flow of fluid through the interior region. The filter element comprises an end cap and a quick-drain valve member secured to an outwardly facing surface of the end cap. The quick-drain valve member blocks a flow of fluid from the interior region through a quick-drain outlet defined by the housing when the filter element is positioned in the interior region and allows a flow of fluid from the interior region through the quick-drain outlet when the filter element is removed from the interior region.

According to another aspect of the present disclosure, the quick-drain valve member comprises a post and a flow blocker. The post is secured to the outwardly facing surface. The flow blocker is secured to the post to engage the housing to block a flow of fluid from the interior region through the quick-drain outlet when the filter element is positioned in the interior region and to disengage the housing to allow a flow of fluid from the interior region through the quick-drain outlet when the filter element is removed from the interior region.

According to another aspect of the disclosure, the quick-drain valve member comprises a retainer, a flow blocker carrier, a biasing element, and a flow blocker. The retainer is secured to the filter element. The flow blocker carrier is secured to the retainer for movement relative thereto. The biasing element biases the flow blocker carrier away from the filter element. The flow blocker is secured to the flow blocker carrier to block a flow of fluid from the interior region through the quick-drain outlet when the filter element is positioned in the interior region and to allow a flow of fluid from the interior region through the quick-drain outlet when the filter element is removed from the interior region.

The above and other features of the present disclosure will become apparent from the following description and the secured drawings.

DETAILED DESCRIPTION OF THE DRAWINGS

Figure 1:
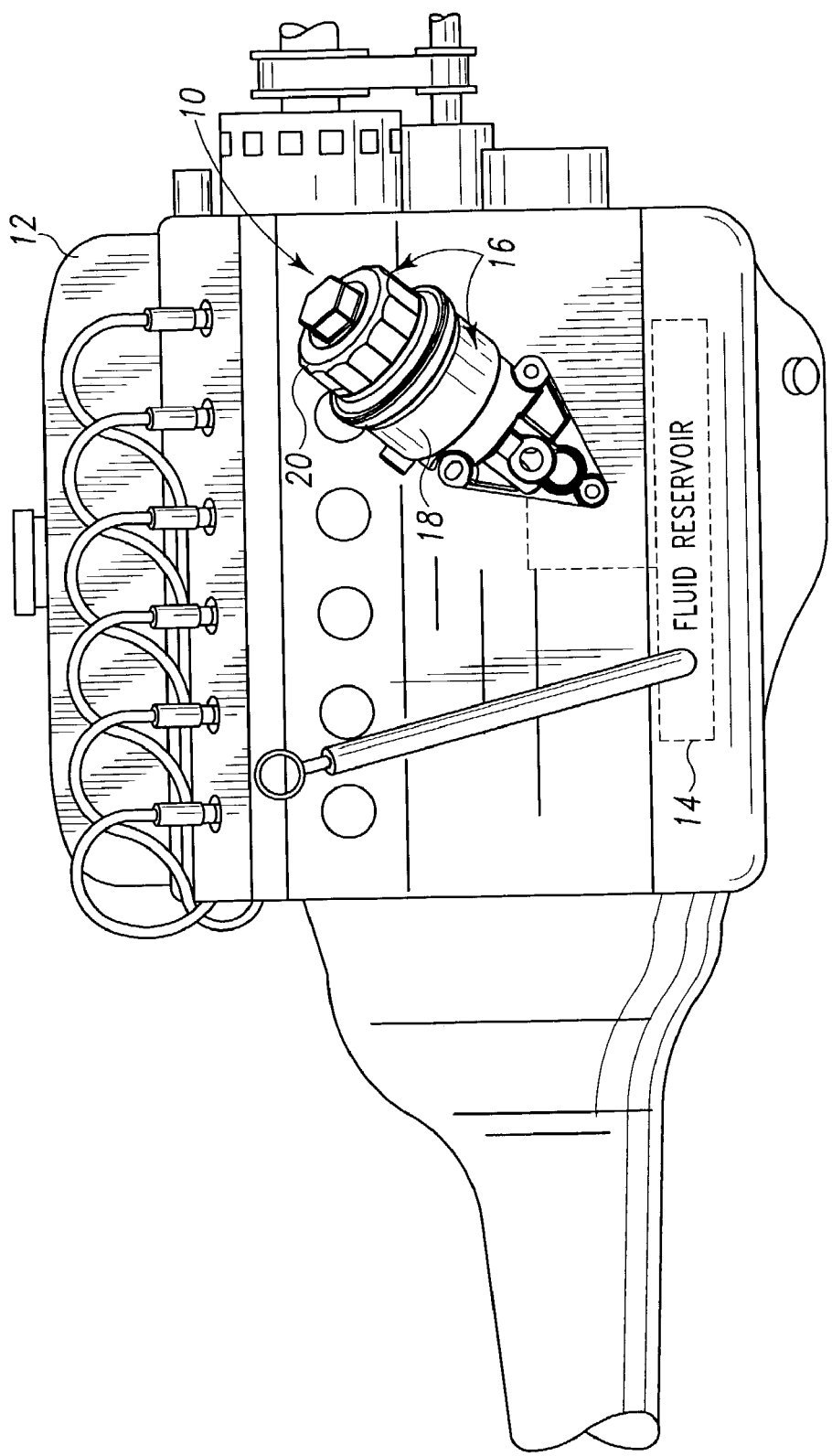
FIG. 1 is an elevation view showing a filter apparatus mounted to an engine to filter fluid (e.g., oil) during operation of the engine.
Figure 2:
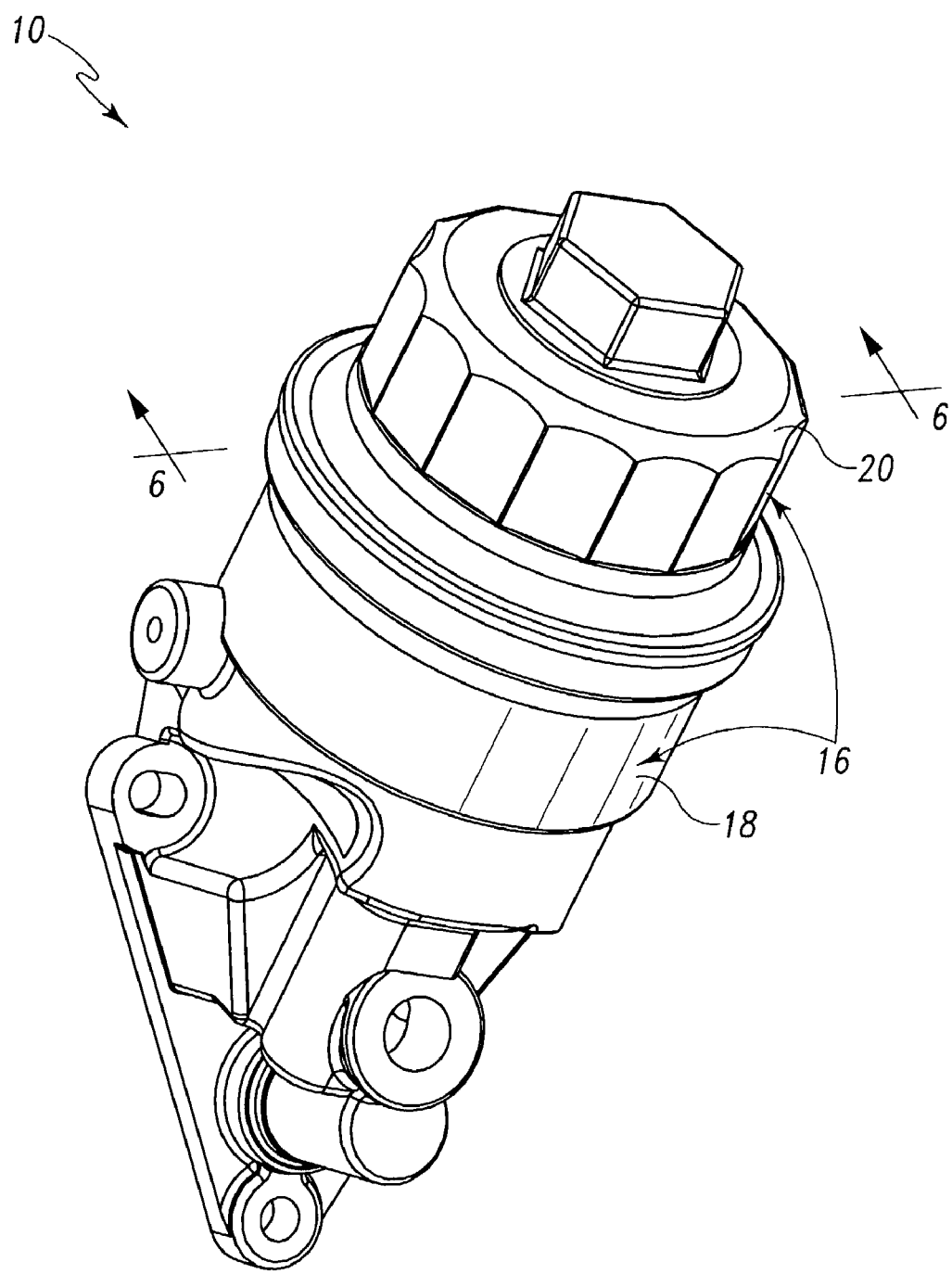
FIG. 2 is a perspective view of the filter apparatus.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

A filter apparatus 10 shown in FIG. 1 is configured to filter a flow of fluid through the filter apparatus 10. The filter apparatus 10 may be mounted to a fluid source such as an engine 12 to filter contaminants from fluid such as engine oil. The filter apparatus 10 is further configured to drain fluid from the filter apparatus 10 to, for example, a fluid reservoir 14 such as an oil sump of the engine 12 upon disassembly of the filter apparatus 10, as discussed in more detail herein.

The filter apparatus 10 comprises a housing 16, as shown in FIGS. 1–3 and 6–7. A base 18 of the housing 16 is configured to be secured to the engine 12. A cover 20 of the housing 16 is configured to be secured to the base 18 via a threaded connection or other suitable connection. Together, the base 18 and the cover 20 define an interior region 22 (see FIG. 6) when the cover 20 is secured to the base 18.

The base 18 comprises passageways of the interior region 22 to admit fluid into and discharge fluid from a filter chamber 23 (see FIG. 6) of the interior region 22. The base 18 comprises an inlet passageway 24 (see FIG. 3), a filtered fluid outlet passageway 26 (see FIGS. 3, 6, and 7), a bypass passageway 28 (see FIG. 3), and a quick-drain passageway 30 (see FIGS. 3, 6, and 7). The inlet passageway 24 admits unfiltered fluid into the filter chamber 23. The filtered fluid outlet passageway 26 discharges fluid filtered by the filter element 32 from the filter chamber 23. The bypass passageway 28 contains a bypass valve 34 (see FIG. 3) to discharge unfiltered fluid from the filter chamber 23 when, for example, the filter element 32 becomes clogged with contaminants and/or the fluid is somewhat thick due to, for example, cold weather. The quick-drain passageway 26 discharges fluid from the filter chamber 23 through a quick-drain outlet 36 (see FIGS. 6–7) when the filter element 32 is removed from the filter chamber 23.

The filter element 32 comprises filter media 38 and a pair of annular end caps 40, 42, as shown in FIGS. 3–7. The filter media 38 is configured to filter a flow of fluid through the filter media 38. The end caps 40, 42 are secured to ends of the filter media 38. An elastomeric seal 44 is secured to the end cap 42 for engagement with an outlet post 46 defining the filtered fluid outlet passageway 26 to block fluid from flowing between the filter element 32 and the outlet post 46.

Figure 3:
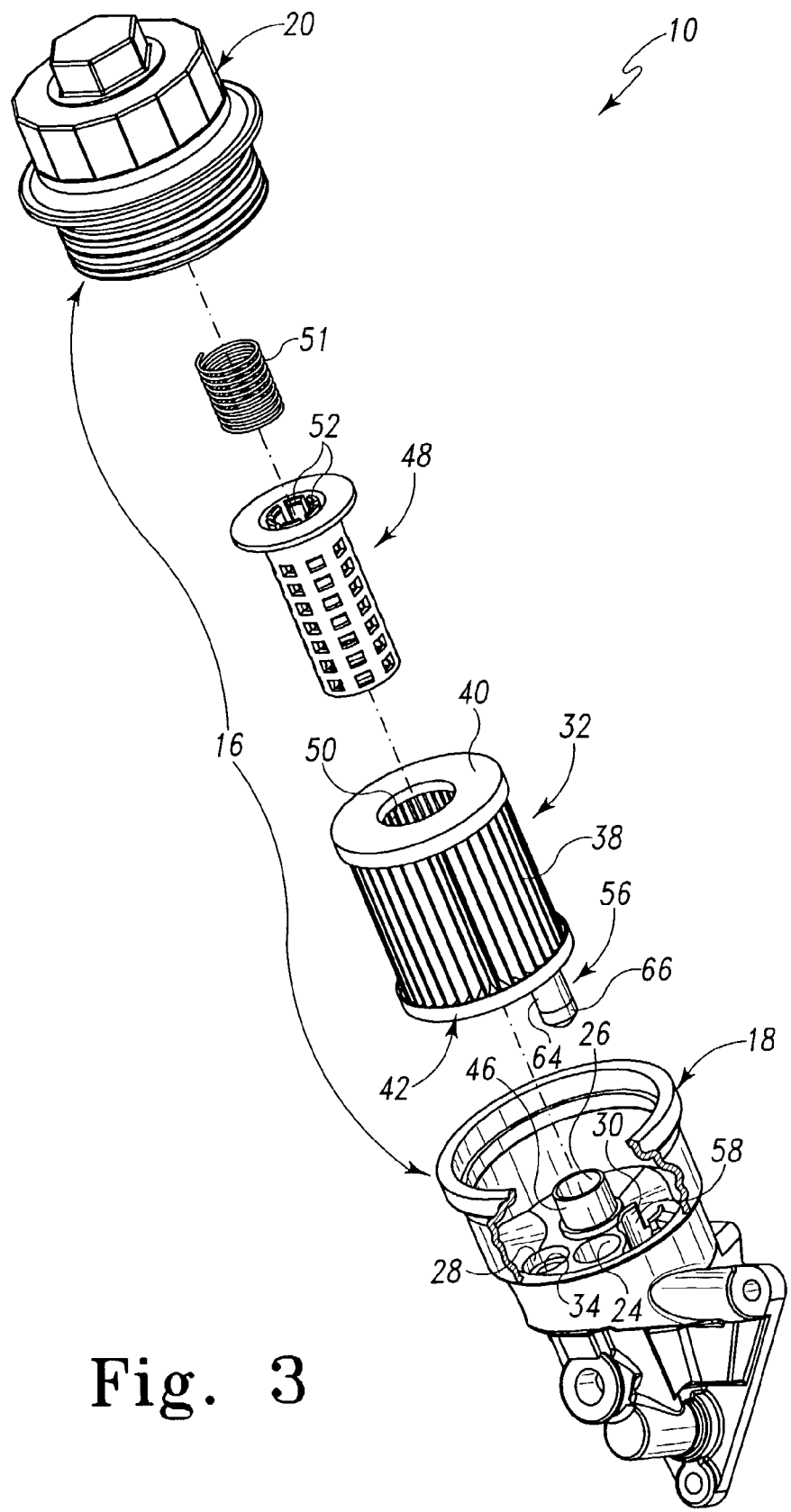
FIG. 3 is an exploded perspective view, with portions broken away, of the filter apparatus.
Figure 4:
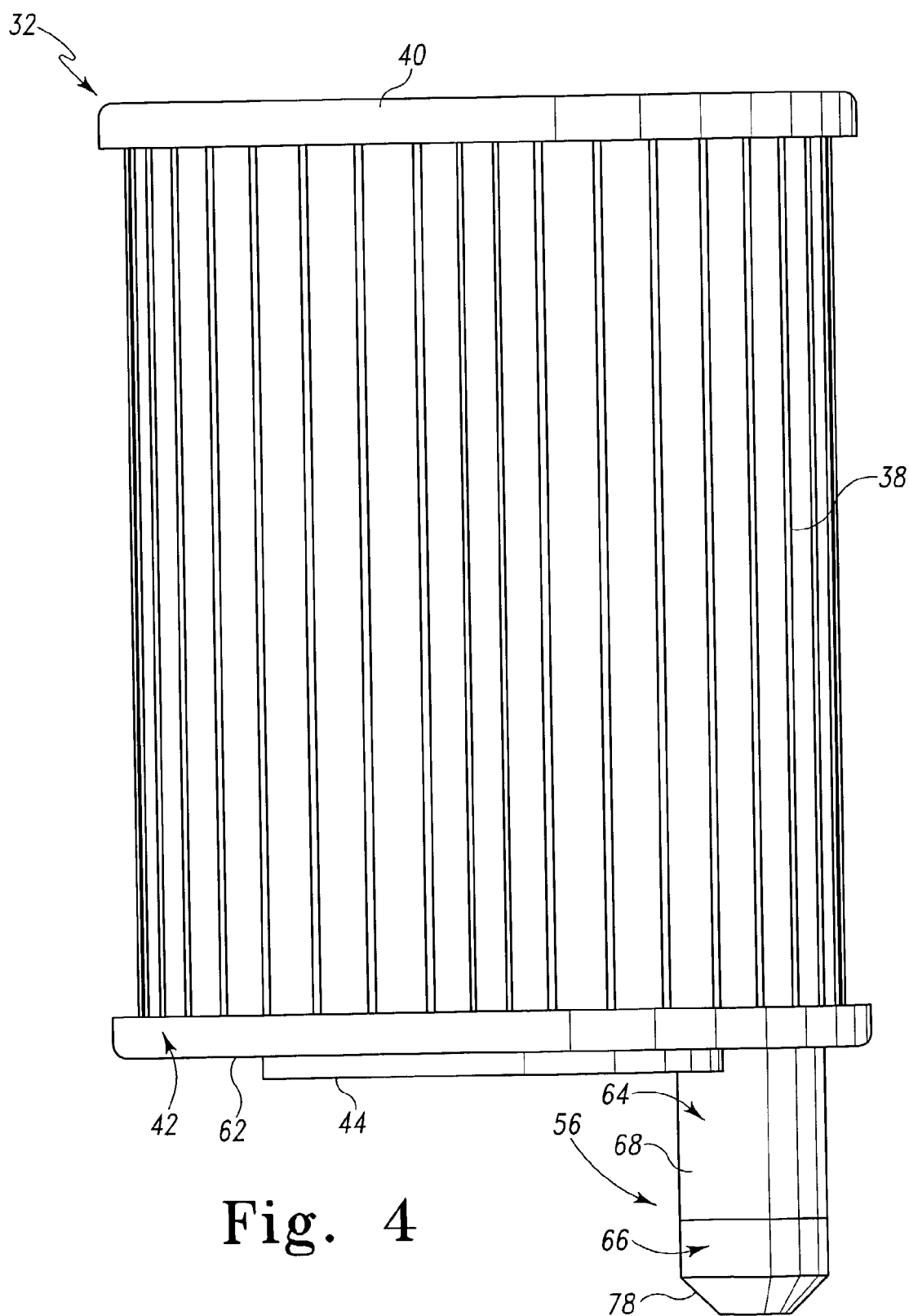
FIG. 4 is an elevation view of a filter element of the filter apparatus.
Figure 6:
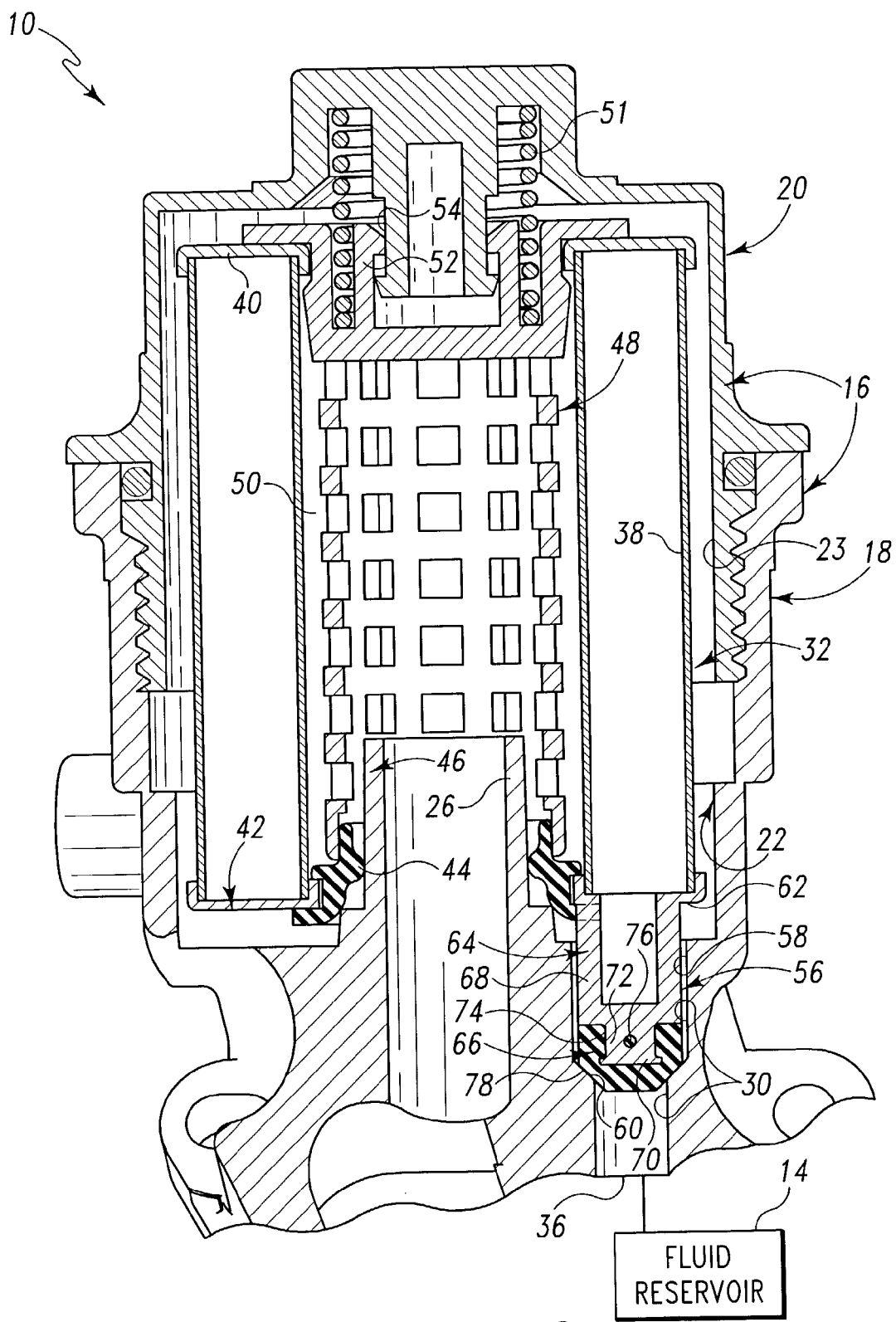
FIG. 6 is a sectional view taken along lines 6—6 of FIG. 2 showing the filter apparatus assembled with the quick-drain valve member of FIG. 5 engaging a valve seat to block a flow of fluid from the filter apparatus through a quick-drain outlet to a fluid reservoir.
Figure 7:
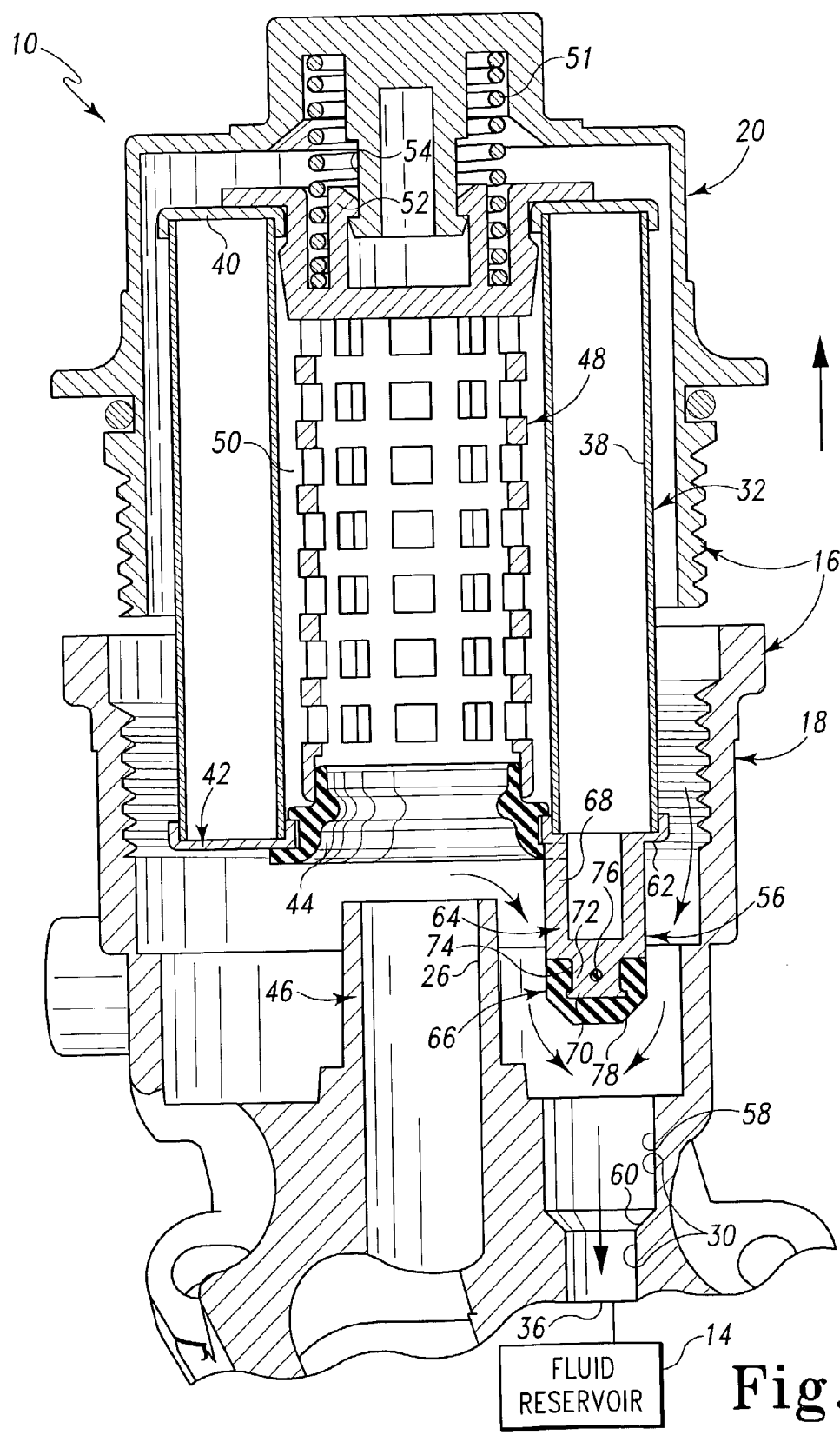
FIG. 7 is a sectional view similar to FIG. 6 except that the filter apparatus is shown being disassembled so as to cause its quick-drain valve member to disengage the valve seat to allow a flow of fluid to drain from the filter apparatus through the quick-drain outlet to the fluid reservoir.
Figure 8:
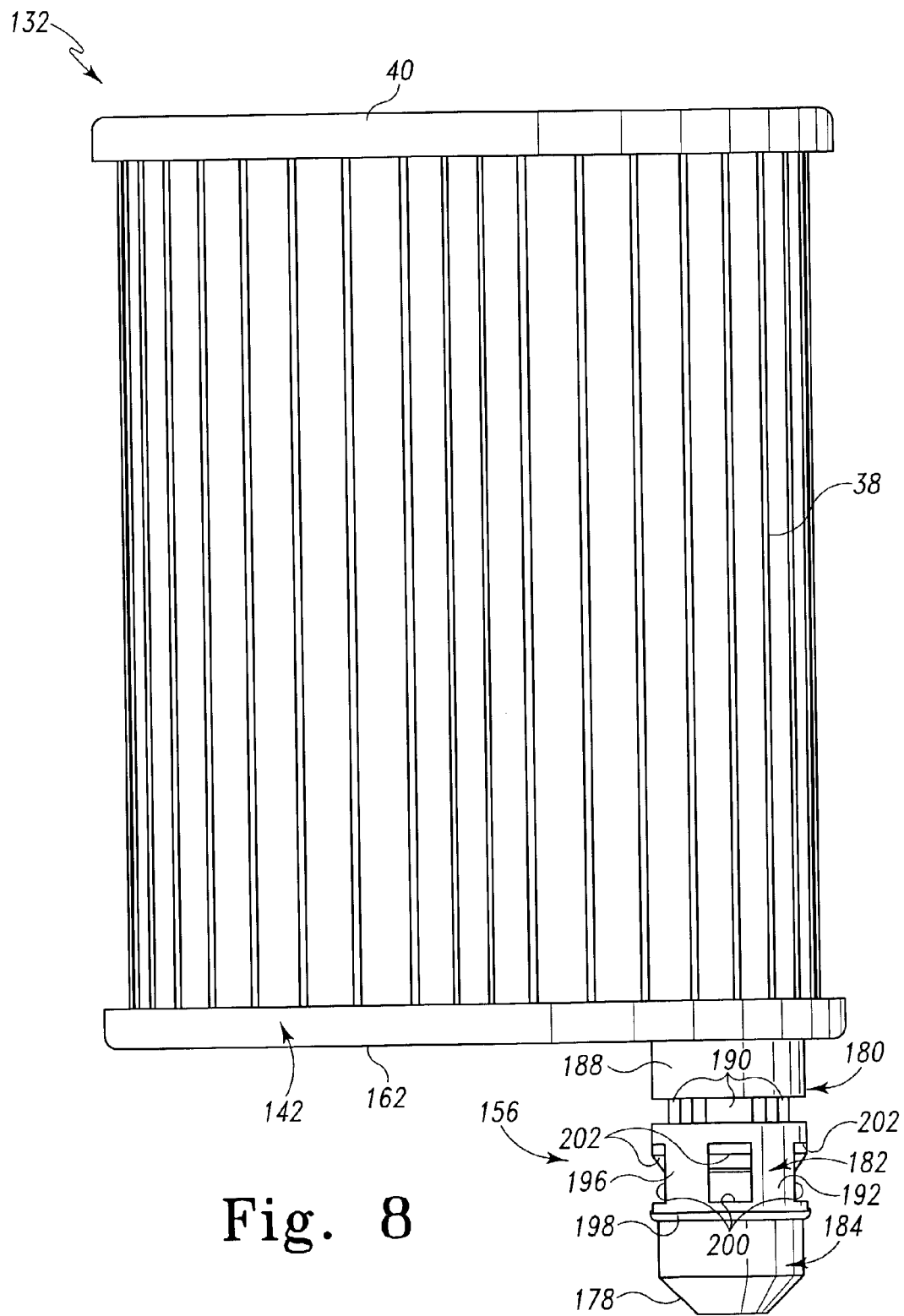
FIG. 8 is an elevation view of another filter element for use with the filter apparatus.

A center tube 48 shown in FIGS. 3, 6, and 7 provides internal support to the filter media 38. The center tube 48 extends within a filtered fluid region 50 that is defined by the filter element 32 and receives fluid flowing inwardly through the filter media 38.

The center tube 48 connects the filter element 32 to the filter cover 20. The end cap 40 is secured to, for example, an upper portion of the center tube 48. The center tube 48 comprises a plurality of outwardly extending flexible fingers 52 mounted to the filter cover 20 for movement in an annular groove 54 formed therein during assembly and disassembly of the filter apparatus 10. A spring 51 (see FIGS. 3, 6, and 7) captured between the cover 20 and the center tube 48 pushes against the center tube 48 to press a quick-drain valve member 56 (see FIGS. 3–7) secured to the end cap 42 against the base 18. The spring 51 is configured to compress in response to engagement between the quick-drain valve member 56 and the base 18. In this way, the spring 51 accommodates dimensional variations between components of the filter apparatus 10 due to, for example, manufacturing tolerances and thermal expansion. The spring 51 is, for example, a coil spring.

The quick-drain valve member 56 controls flow of fluid through the quick-drain outlet 36. The quick-drain valve member 56 extends in a valve chamber 58 defined by the base 18 and engages a valve seat 60 of the base 18 to block a flow of fluid from the interior region 22 through the quick-drain outlet 36 to the fluid reservoir 14 when the filter element 32 is positioned in the interior region 22, as shown in FIG. 6. In particular, when the filter element 32 is positioned in the filter chamber 23, the quick-drain valve member 56 extends in the valve chamber 58 so as to block fluid flow from the interior region 22 to the fluid reservoir 14. The quick-drain valve member 56 is removed from the valve chamber 58 and disengages the valve seat 60 to allow a flow of fluid from the interior region 22 through the quick-drain outlet 36 to the fluid reservoir 14 when the filter element 32 is removed from the interior region 22, as shown in FIG. 7. In particular, when the filter element 32 is removed from the filter chamber 23, the quick-drain valve member 56 is removed from the valve chamber 58 thereby allowing fluid to advance from the interior region 22 to the fluid reservoir 14.

The quick-drain valve member 56 is secured to and extends from an outwardly facing surface 62 of the end cap 42, as shown in FIGS. 4–7. The quick-drain valve member 56 is spaced apart from the central axis of the center tube 48.

The quick-drain valve member 56 comprises a post 64 and a flow blocker 66 secured to the post 64, as shown in FIGS. 3–7. The post 64 defines a proximal end portion of the quick-drain valve member 56, and the flow blocker 66 defines a distal end portion of the quick-drain valve member 56. The flow blocker 66 is secured to the post 64 so as to define an axial end of the quick-drain valve member 56 distal from the outwardly facing surface 62 and to axially engage the housing 16 to block a flow of fluid from the interior region 22 through the quick-drain outlet 36 when the filter element 32 is positioned in the interior region 22 and to axially disengage the housing 16 to allow a flow of fluid from the interior region 22 through the quick-drain outlet 36 when the filter element 32 is removed from the interior region 22. Exemplarily, the post 64 and the end cap 42 are made of a plastic material and are monolithic with one another. It should be appreciated that the post 64 and the end cap 42 may be made discrete from one another. The flow blocker 66 is, for example, made of an elastomeric material and molded onto the post 64.

The flow blocker 66 is configured as a compressible element that is secured to and covers an end of the post 64, has a generally C-shaped cross-section comprising a cavity and an opening into the cavity such that the post 64 extends through the opening into the cavity, and radially surrounds and extends axially beyond the post 64 relative to a central axis of the quick-drain valve member 56.

Figure 5:
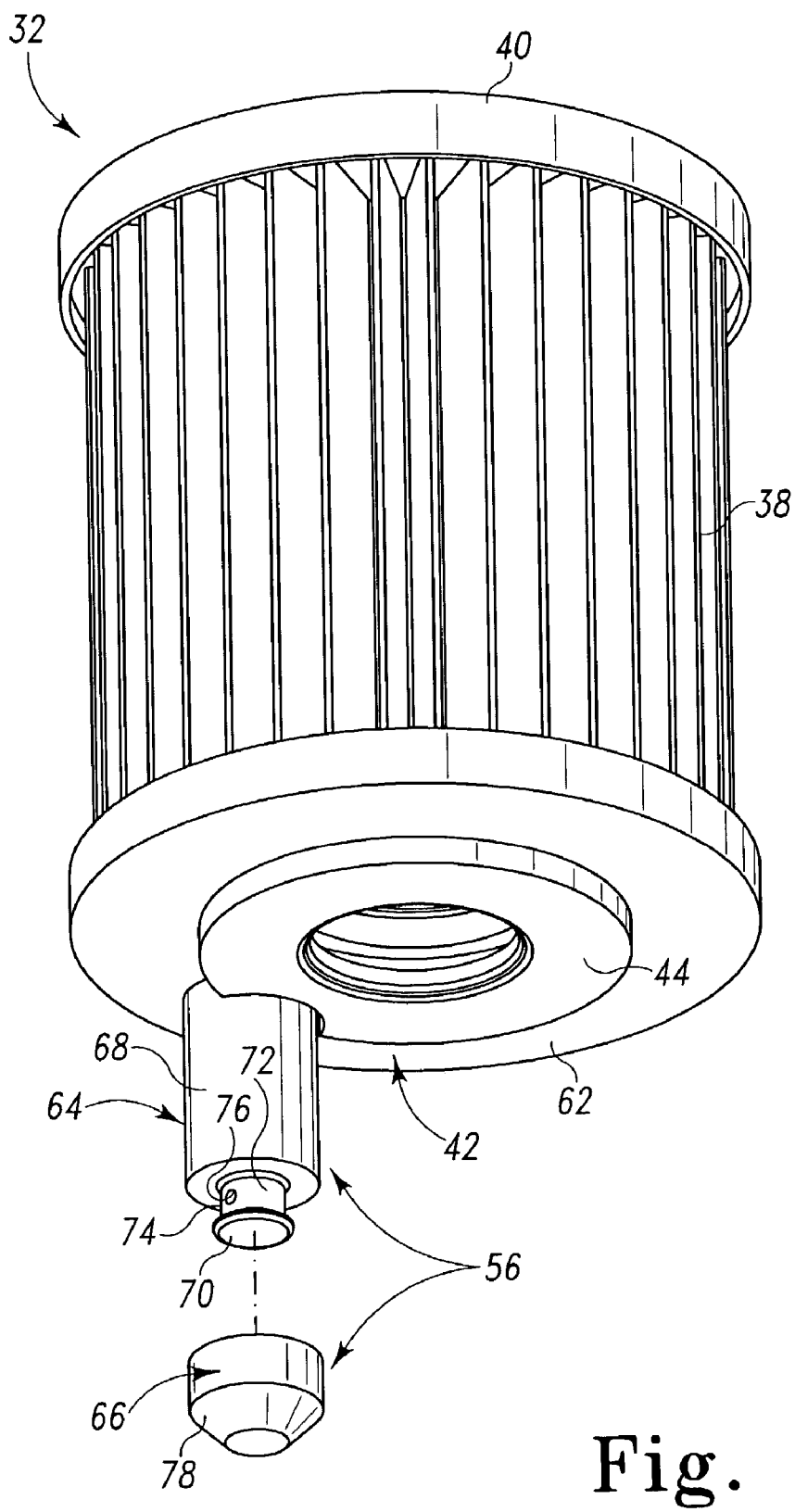
FIG. 5 is a perspective view showing the filter element of FIG. 4 with a quick-drain valve member that is exploded.

The post 64 comprises a body 68, a head 70, and a neck 72 interconnecting the body 68 and the head 70, as shown in FIGS. 5–7. The body 68 is secured to and extends from the outwardly facing surface 62. The head 70 has a diameter less than a diameter of the body 68. The neck 72 has a diameter less than the diameters of the body 68 and the head 70. The body 68, the head 70, and the neck 72 cooperate to define an annular groove 74. The neck 72 defines a channel 76 extending through the neck 72. The flow blocker 66 surrounds the head 70 and the neck 72 and extends into the annular groove 74 and through the channel 76 to mount the flow blocker 66 to the post 64. Illustratively, the head 70 is configured as a rib gripped by the flow blocker 66.

The flow blocker 66 comprises a surface 78, as shown in FIGS. 4–7, for engaging the valve seat 60. The surface 78 and the valve seat 60 are, for example, frusto-conical in shape. The surface 78 engages the valve seat 60 when the filter element 32 is positioned in the interior region 22, as shown in FIG. 6, and disengages the valve seat 60 when the filter element 32 is removed from the interior region 22, as shown in FIG. 7. Further, the surface 78 extends from a cylindrical surface of the flow blocker 66. The cylindrical surface surrounds a portion of the post 64.

Another filter element 132 for use with the filter apparatus 10 is shown in FIGS. 8–11. The filter element 132 is similar in structure and function to the filter element 32, except as otherwise noted, so that identical reference numbers refer to similar structures.

Figure 10:
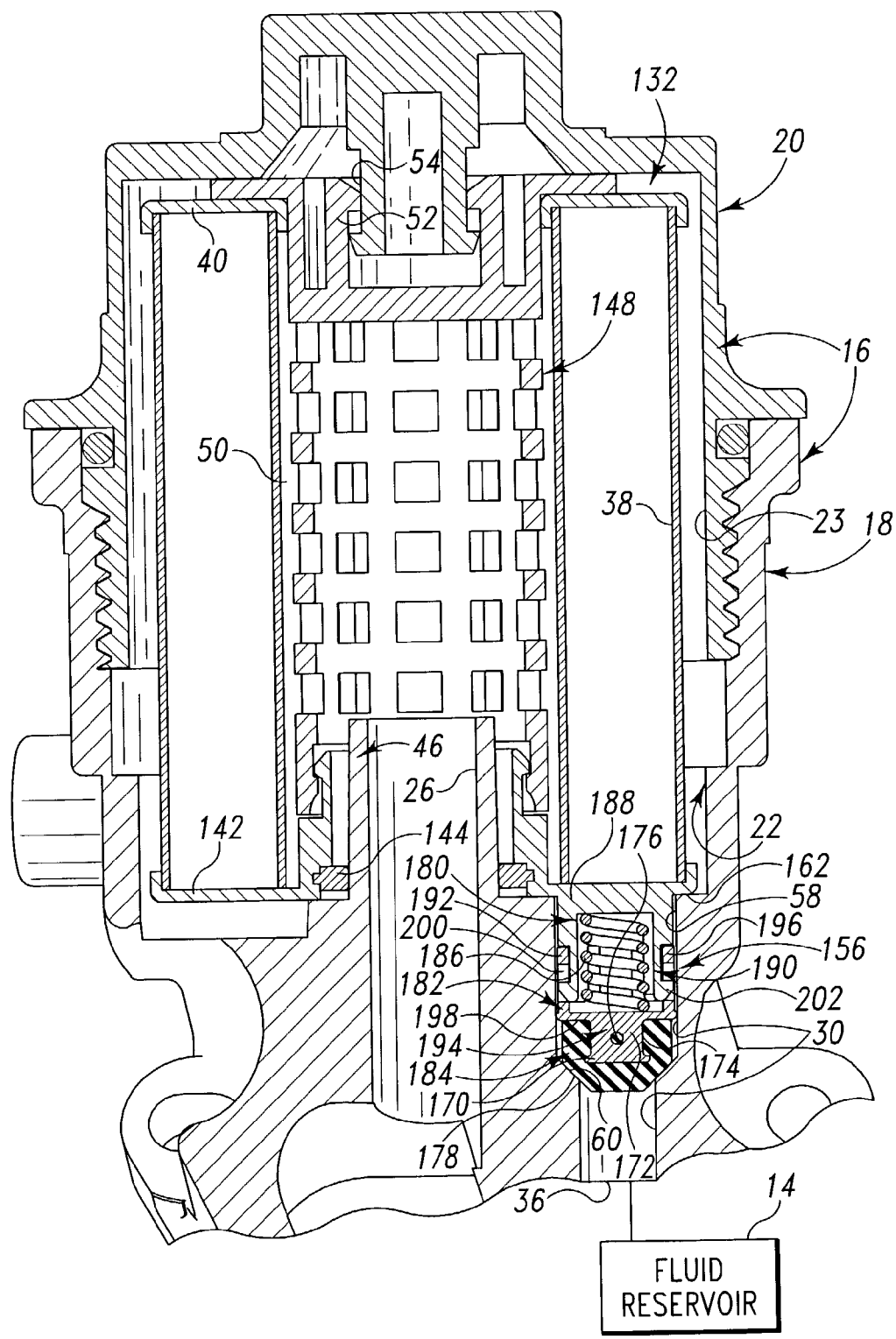
FIG. 10 is a sectional view similar to FIG. 6 showing the filter apparatus assembled with the quick-drain valve member of FIG. 9 engaging the valve seat to block a flow of fluid from the filter apparatus through the quick-drain outlet to the fluid reservoir.
Figure 11:
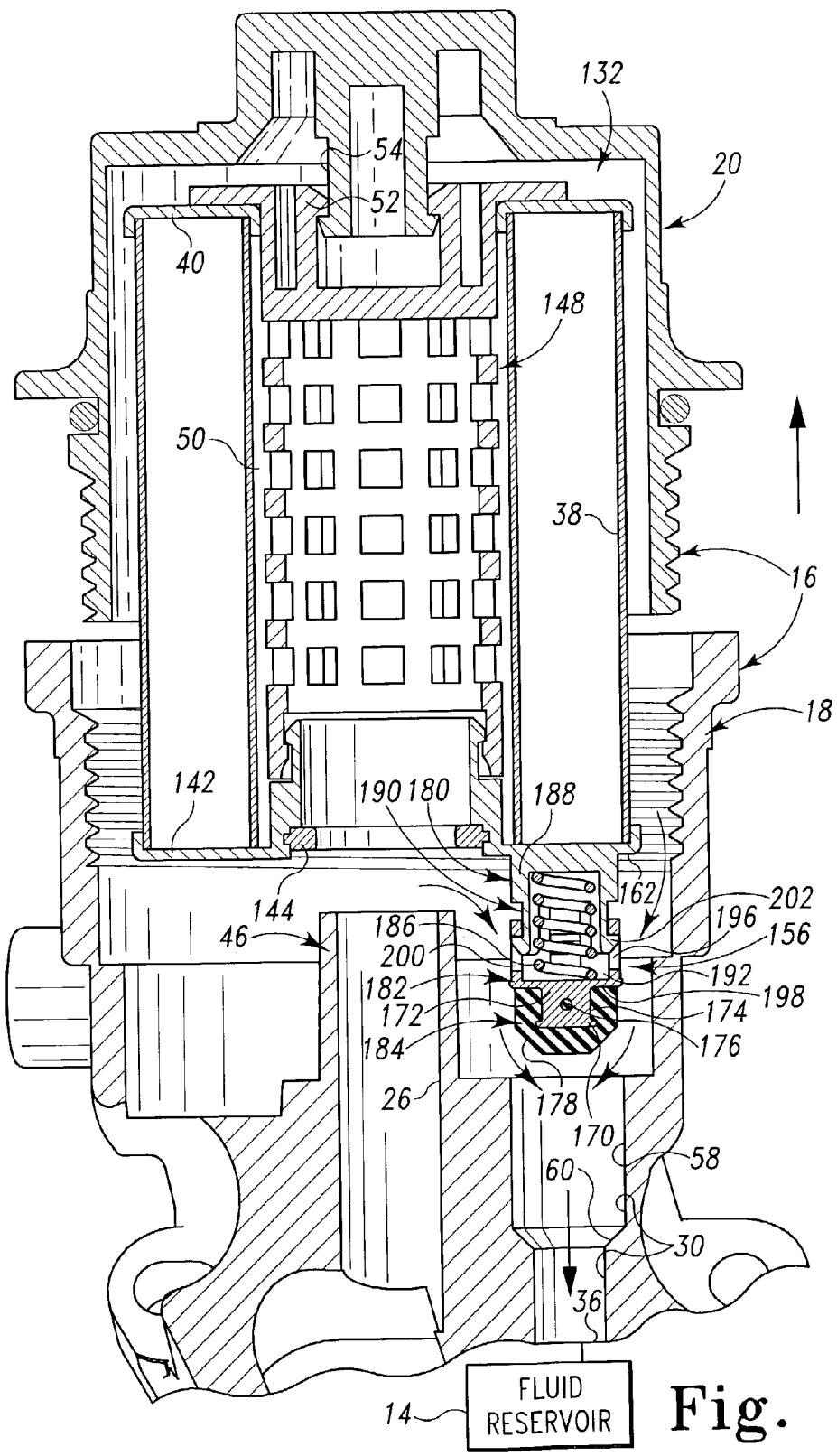
FIG. 11 is a sectional view similar to FIG. 10 except that the filter apparatus is shown being disassembled so as to cause the quick-drain valve member to disengage the valve seat to allow a flow of fluid to drain from the filter apparatus through the quick-drain outlet to the fluid reservoir.

The filter element 132 is secured to a center tube 148, as shown in FIGS. 10–11. An end cap 142 of the filter element 132 is secured to, for example, a lower portion of the center tube 148 which extends in the filtered fluid region 50 to provide internal support to the filter media 38. Fingers 52 of the center tube 148 extend in the annular groove 54 formed in the cover 20 for movement therein during assembly and disassembly of the filter apparatus 10. A seal 144 is secured to the end cap 142 for engagement with the outlet post 46 to block flow of fluid between the end cap 142 and the outlet post 46.

A quick-drain valve member 156 shown in FIGS. 8–11 controls flow of fluid through the quick-drain outlet 36. The quick-drain valve member 156 extends in the valve chamber 58 and engages the valve seat 60 to block a flow of fluid from the interior region 22 through the quick-drain outlet 36 to the fluid reservoir 14 when the filter element 132 is positioned in the interior region 22, as shown in FIG. 10. In particular, when the filter element 132 is positioned in the filter chamber 23, the quick-drain valve member 156 extends in the valve chamber 58 so as to block fluid flow from the interior region 22 to the fluid reservoir 14. The quick-drain valve member 156 is removed from the valve chamber 58 and disengages the valve seat 60 to allow a flow of fluid from the interior region 22 through the quick-drain outlet 36 to the fluid reservoir 14 when the filter element 132 is removed from the interior region 22, as shown in FIG. 11. In particular, when the filter element 132 is removed from the filter chamber 23, the quick-drain valve member 156 is removed from the valve chamber 58 thereby allowing fluid to advance from the interior region 22 to the fluid reservoir 14.

The quick-drain valve member 156 is secured to and extends from the an outwardly facing surface 162 of the end cap 142, as shown in FIGS. 8–11. The quick-drain valve member 156 is axially spaced apart from the center tube 148.

Figure 9:
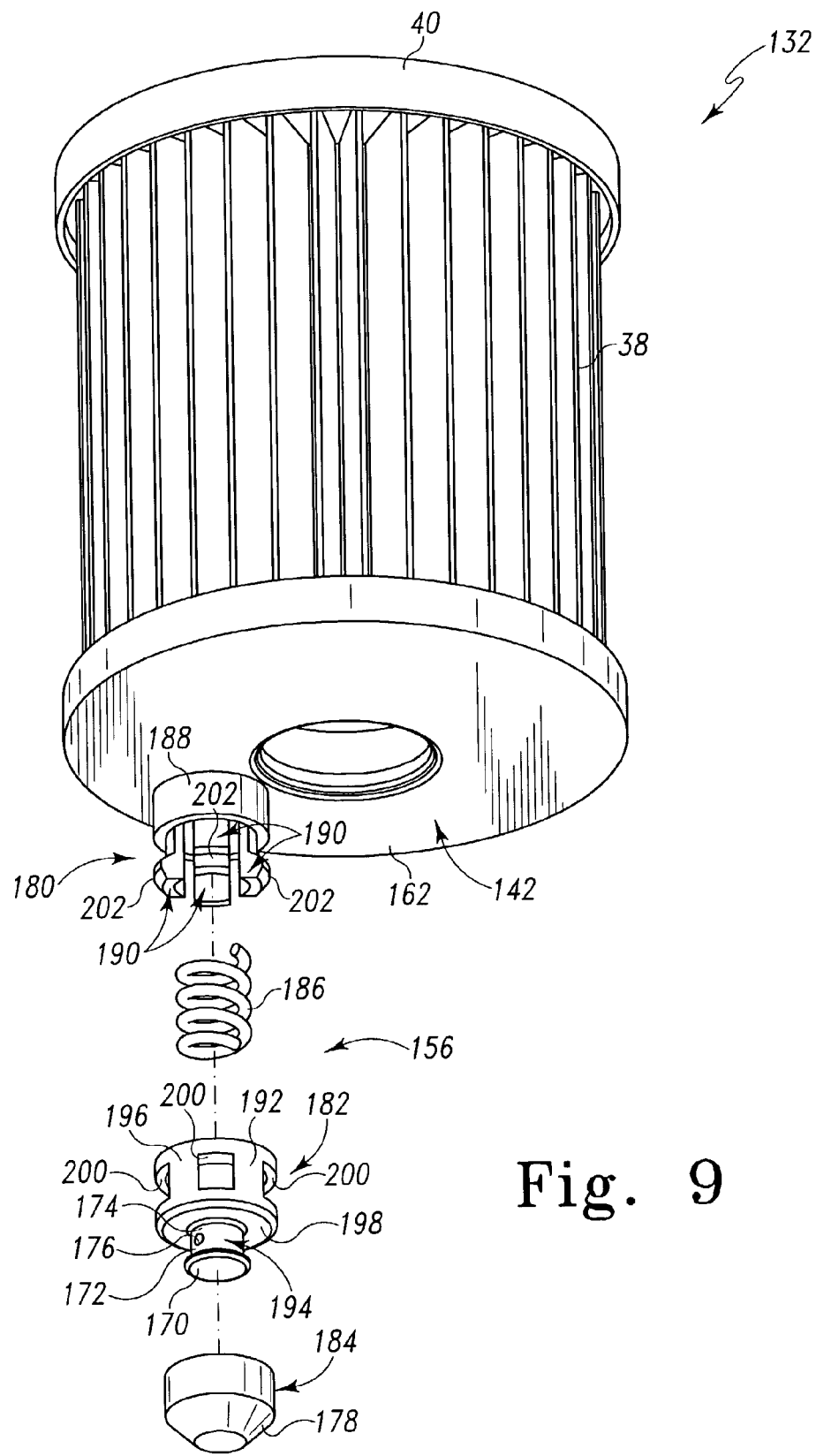
FIG. 9 is a perspective view showing the filter element of FIG. 8 with a quick-drain valve member that is exploded.

The quick-drain valve member 156 comprises a retainer 180, a flow blocker carrier 182, and a flow blocker 184, as shown in FIGS. 9–11. The retainer 180 is secured to and extends axially from the outwardly facing surface 162. The flow blocker carrier 182 is secured to the retainer 180 for movement relative thereto. The flow blocker 184 is secured to the flow blocker carrier 182 so as to define an axial end of the quick-drain valve member 156 distal from the outwardly facing surface 162 and to axially engage the housing 16 to block a flow of fluid from the interior region 22 through the quick-drain outlet 36 when the filter element 132 is positioned in the interior region 22 and to axially disengage the housing 16 to allow a flow of fluid from the interior region 22 through the quick-drain outlet 36 when the filter element 132 is removed from the interior region 22. The flow blocker 184 comprises a frusto-conical surface 178 to engage the valve seat 60 when the filter element 132 is positioned in the interior region 22 and to disengage the valve seat 60 when the filter element 132 is removed from the interior region 22. The surface 178 extends from a cylindrical surface of the flow blocker 184. The flow blocker 184 is made of, for example, an elastomeric material. The retainer 180 and the flow blocker 184 define a proximal end portion and a distal end portion, respectively, of the quick-drain valve member 156.

A biasing element such as a spring 186 (see FIGS. 9–11) is captured within the retainer 180 and the flow blocker carrier 182. The spring 186 biases the flow blocker carrier 182 axially away from the outwardly facing surface 162 to press the flow blocker 184 against the valve seat 60. The spring 186 is configured to compress in response to engagement between the flow blocker 184 and the valve seat 60. In this way, the spring 186 accommodates dimensional variations between components of the filter apparatus 10 due to, for example, manufacturing tolerances and thermal expansion. The spring 51 is thus omitted from the filter apparatus 10 when the spring 186 is present.

The retainer 180 comprises a base 188 secured to the outwardly facing surface 162 and a plurality of flexible fingers 190 secured to the base 188, as shown in FIGS. 9–11. The fingers 190 are spaced around the spring 186. Exemplarily, the base 188, the fingers 190, and the end cap 142 are made of a plastic material and formed monolithically with one another. It should be appreciated that the base 188, the fingers 190, and the end cap 142 may be discrete from one another. Further, the retainer 180 may be without the base 188 so that the fingers 190 are secured directly to the outwardly facing surface 162. There are, for example, four fingers 190.

The flow blocker carrier 182 comprises a cup 192 and a post 194 secured thereto, as shown in FIGS. 9–11. The flow blocker 184 is secured to and encloses the post 194 by, for example, molding the flow blocker 184 onto the post 194. The cylindrical surface of the flow blocker 184 surrounds a portion of the post 194. The flow blocker 184 is configured as a compressible element that is secured to and covers an end of the post 194, has a generally C-shaded cross-section comprising a cavity and an opening into the cavity such that the post 194 extends through the opening into the cavity, and radially surrounds and extends axially beyond the post 194 relative to a central axis of the quick-drain valve member 156.

The cup 192 comprises a sleeve 196 and an end wall 198 secured to the sleeve 196. The sleeve 196 and the post 194 extend in opposite directions from the wall 198. The spring 186 is surrounded by the sleeve 196 and engages the wall 198 to bias the flow blocker carrier 182 away from the outwardly facing surface 162.

The sleeve 196 defines apertures 200 to receive detents 202 of the fingers 190, as shown in FIGS. 8–11. There are, for example, four apertures 200, one for each detent 202. The apertures 200 and the detents 202 are sized to allow relative movement between the detents 202 and the sleeve 196 in response to engagement and disengagement between the flow blocker 184 and the valve seat 60. The detents 202 engage the sleeve 196 to establish a maximum distance that the flow blocker carrier 182 may move away from the outwardly facing surface 162 when the flow blocker 184 disengages the valve seat 60.

The post 194 comprises a head 170 and a neck 172 interconnecting the cup 192 and the head 70, as shown in FIGS. 9–11. The head 170 has a diameter less than a diameter of the cup 192. The neck 172 is secured to and extends from the end wall 198 and has a diameter less than the diameters of the head 172 and the cup 192. The cup 192, the head 170, and the neck 172 cooperate to define an annular groove 174. The neck 172 defines a channel 176 extending through the neck 172. The flow blocker 184 surrounds the head 170 and the neck 172 and extends into the annular groove 174 and through the channel 176 to mount the flow blocker 184 to the post 194. Illustratively, the head 70 is configured as a rib gripped by the flow blocker 184.

While the concepts of the present disclosure have been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the concepts of the present disclosure arising from the various features of the apparatus described herein. It will be noted that alternative embodiments of apparatus of the present disclosure may not include all of the features described yet still benefit from at least some of the advantages of such features. Those of ordinary skill in the art may readily devise their own implementations of an apparatus that incorporate one or more of the features of the present disclosure and fall within the spirit and scope of the invention as defined by the appended claims.

The invention claimed is:

1. A filter apparatus comprising:
a housing defining an interior region and a quick-drain outlet, and
a filter element positioned in the interior region to filter a flow of fluid through the interior region, the filter element comprising (i) an end cap comprising an outwardly facing surface and (ii) a quick-drain valve member secured to the outwardly facing surface to block a flow of fluid from the interior region through the quick-drain outlet when the filter element is positioned in the interior region and to allow a flow of fluid from the interior region through the quick-drain outlet when the filter element is removed from the interior region,
wherein the quick-drain valve member comprises a post and a an elastomeric flow blocker, the post is secured to the outwardly facing surface, and the flow blocker is secured to the post so as to define an axial end of the quick-drain valve member distal from the outwardly facing surface and to axially engage the housing to block a flow of fluid from the interior region through the quick-drain outlet when the filter element is positioned in the interior region and to axially disengage the housing to allow a flow of fluid from the interior region through the quick-drain outlet when the filter element is removed from the interior region, the post comprises (i) a body secured to the outwardly facing surface, (ii) a head having a diameter less than a diameter of the body, and (iii) a neck interconnecting the body and the head, the neck having a diameter less than the diameters of the body and the head, the body, the head, and the neck cooperate to define an annular groove, the neck defines a channel extending through the neck, and the flow blocker surrounds the head and the neck and extends into the annular groove and through the channel to mount the flow blocker to the post.

2. The filter apparatus of claim 1, wherein the end cap and the post are made of a plastic material and formed monolithically with one another.

3. The filter apparatus of claim 1, wherein the housing comprises a frusto-conical valve seat and the flow blocker comprises a frusto-conical surface that engages the frusto-conical valve seat to block a flow of fluid from the interior region through the quick-drain outlet when the filter element is positioned in the interior region.

4. A filter apparatus comprising:
a housing defining an interior region and a quick-drain outlet, and
a filter element positioned in the interior region to filter a flow of fluid through the interior region, the filter element comprising (i) an end cap comprising an outwardly facing surface and (ii) a quick-drain valve member secured to the outwardly facing surface to block a flow of fluid from the interior region through the quick-drain outlet when the filter element is positioned in the interior region and to allow a flow of fluid from the interior region through the quick-drain outlet when the filter element is removed from the interior region,
wherein the quick-drain valve member comprises (i) a retainer secured to and extending axially from the outwardly facing surface, (ii) a flow blocker carrier secured to the retainer for movement of the flow blocker carrier relative to the retainer, (iii) a spring biasing the flow blocker carrier axially away from the outwardly facing surface, and (iv) an elastomeric flow blocker secured to the flow blocker carrier so as to define an axial end of the quick-drain valve member distal from the outwardly facing surface and to axially engage the housing to block a flow of fluid from the interior region through the quick-drain outlet when the filter element is positioned in the interior region and to axially disengage the housing to allow a flow of fluid from the interior region through the quick-drain outlet when the filter element is removed from the interior region, and the flow blocker carrier comprises a cup and a post secured to the cup, the cup receives the retainer and the spring, and the flow blocker is secured to and encloses the post.

5. The filter apparatus of claim 4, wherein the retainer comprises a detent, the cup comprises a wall and a sleeve, the spring engages the wall, the sleeve surrounds the spring, the sleeve extends from the wall in a first direction and defines an aperture receiving the detent, and the post extends from the wall in a second direction opposite to the first direction.

6. The filter apparatus of claim 4, wherein:
the post comprises (i) a head having a diameter less than a diameter of the cup and (ii) a neck interconnecting the head and the cup and having a diameter less than the diameters of the head and the cup,
the cup, the head, and the neck cooperate to define an annular groove,
the neck defines a channel extending through the neck,
and the flow blocker surrounds the head and the neck and extends into the annular groove and through the channel to mount the flow blocker to the post.

7. A filter apparatus comprising:
a housing defining an interior region and a quick-drain outlet, and
a filter element positioned in the interior region to filter a flow of fluid through the interior region, the filter element comprising a quick-drain valve member comprising (i) a retainer secured to and extending axially from an end cap of the filter element, (ii) a flow blocker carrier secured to the retainer for movement relative thereto, (iii) a biasing element biasing the flow blocker carrier axially away from the end cap, and (iv) an elastomeric flow blocker secured to the flow blocker carrier so as to define an axial end of the quick-drain valve member and to block a flow of fluid from the interior region through the quick-drain outlet when the filter element is positioned in the interior region and to allow a flow of fluid from the interior region through the quick-drain outlet when the filter element is removed from the interior region,
wherein the housing comprises a valve seat, the retainer comprises axially extending cantilevered fingers and a detent protruding radially outwardly from each finger, the flow blocker carrier comprises a cup and a post secured to and extending axially from the cup and enclosed by the flow blocker, the cup surrounds the fingers and the biasing element and defines apertures larger than and receiving the detents for relative movement between the cup and the detents in response to axial engagement between the flow blocker and the valve seat, and the cup and the post engage the flow blocker to urge the flow blocker axially against the valve seat in response to operation of the biasing element.

8. A filter apparatus comprising:
a housing comprising a valve seat and defining an interior region and a quick-drain outlet, and
a filter element positioned in the interior region to filter a flow of fluid through the interior region, the filter element comprising (i) an end cap comprising an outwardly facing surface and (ii) a quick-drain valve member secured to and extending axially from the outwardly facing surface and comprising an elastomeric compressible element providing an axial end of the quick-drain valve distal from the outwardly facing surface to axially engage the valve seat to block discharge of fluid from the interior region through the quick-drain outlet when the filter element is positioned in the interior region and to axially disengage the valve seat to allow discharge of fluid from the interior region through the quick-drain outlet when the filter element is removed from the interior region.

9. The filter apparatus of claim 8, wherein the housing defines a filter chamber and a valve chamber, the quick-drain valve member extends in the valve chamber when the filter element is positioned in the filter chamber and is removed from the valve chamber when the filter element is removed form the filter chamber, the valve chamber comprises a side wall extending from the filter chamber to the valve seat, and the valve seat extends radially inwardly from the side wall for engagement and disengagement with the compressible element.

10. The filter apparatus of claim 8, wherein the quick-drain valve member comprises a post, and the compressible element is secured to and covers an end of the post.

11. The filter apparatus of claim 10, wherein the post comprises (i) a body secured to the outwardly facing surface, (ii) a head providing the end of the post covered by the compressible element and having a diameter less than a diameter of the body, and (iii) a neck interconnecting the body and the head, the neck having a diameter less than the diameters of the body and the head, the body, the head, and the neck cooperate to define an annular groove, the neck defines a channel extending through the neck, and the compressible element surrounds the head and the neck and extends into the annular groove and through the internal channel to mount the compressible element to the post.

12. The filter apparatus of claim 10, wherein the quick-drain valve member comprises a retainer secured to the outwardly facing surface, a cup secured to the retainer for relative movement between the cup and the retainer, and a biasing element received in the cup to urge the cup away from the outwardly facing surface, and the post is secured to the cup.

13. The filter apparatus of claim 12, wherein:
the post comprises (i) a head having a diameter less than a diameter of the cup and (ii) a neck interconnecting the head and the cup and having a diameter less than the diameters of the head and the cup,
the cup, the head, and the neck cooperate to define an annular groove,
the neck defines a channel extending through the neck,
and the compressible element surrounds the head and the neck and extends into the annular groove and through the channel to mount the compressible element to the post.

14. The filter apparatus of claim 10, wherein the post defines an internal channel extending through the post, and the compressible element extends through the internal channel.

15. The filter apparatus of claim 10, wherein the compressible element has a generally C-shaped cross-section comprising a cavity and an opening into the cavity, and the post extends through the opening into the cavity.

16. The filter apparatus of claim 10, further comprising a coil spring positioned between a cover of the housing and the filter element and acting through the filter element so as to urge the compressible element axially against the valve seat.

17. The filter apparatus of claim 8, wherein the compressible element radially surrounds and extends axially beyond the post relative to a central axis of the quick-drain valve member.

18. The filter apparatus of claim 8, wherein the quick-drain valve member comprises a rib, and the compressible element grips the rib.

19. The filter apparatus of claim 8, wherein the valve seat is frusto-conical, and the compressible element comprises a cylindrical surface surrounding a portion of the post and a frusto-conical surface extending from the cylindrical surface and configured to engage and disengage the valve seat.

20. The filter apparatus of claim 8, wherein the valve seat is frusto-conical, and the compressible element comprises a frusto-conical surface configured to axially engage and disengage the valve seat.

* * * * *